US010683857B2

(12) United States Patent
Escher et al.

(10) Patent No.: US 10,683,857 B2
(45) Date of Patent: Jun. 16, 2020

(54) PUMP DEVICE FOR A BRAKE SYSTEM WITH A RELUCTANCE DRIVE

(71) Applicant: Robert Bosch GmbH, Stuttgart (DE)

(72) Inventors: Guenter Escher, Oberstdorf (DE); Gerhard Stransky, Immenstadt (DE); Ben Ferguson, Rettenberg (DE); Dietmar Kratzer, Tamm (DE); Franz Mayer, Haldenwang (DE); Michael Specker, Blaichach (DE); Stefan Achilles, Immenstadt/Stein (DE); Bernd Lutz, Kempten (DE); Alice Schacherl, Burgberg (DE); Anton Paweletz, Fellbach (DE); Hermann Bamberger, Immenstadt (DE); Roland Heller, Immenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 222 days.

(21) Appl. No.: 15/576,952

(22) PCT Filed: Apr. 18, 2016

(86) PCT No.: PCT/EP2016/058485
§ 371 (c)(1),
(2) Date: Nov. 27, 2017

(87) PCT Pub. No.: WO2016/188672
PCT Pub. Date: Dec. 1, 2016

(65) Prior Publication Data
US 2018/0149151 A1    May 31, 2018

(30) Foreign Application Priority Data
May 27, 2015    (DE) .................. 10 2015 209 728

(51) Int. Cl.
*F04B 17/04* (2006.01)
*F04B 5/02* (2006.01)
(Continued)

(52) U.S. Cl.
CPC ............ *F04B 17/042* (2013.01); *B60T 13/16* (2013.01); *F04B 5/02* (2013.01); *F04B 13/02* (2013.01);
(Continued)

(58) Field of Classification Search
CPC .. F04B 1/02; F04B 5/00; F04B 17/042; F04B 17/044; F04B 49/06; F04B 53/14;
(Continued)

(56) References Cited

U.S. PATENT DOCUMENTS 2,497,300 A   2/1950  Elliott
3,754,154 A   8/1973  Massie
(Continued)

FOREIGN PATENT DOCUMENTS

CH    630 443 A5    6/1982
DE    2715102 A1 * 10/1978 ............... F04B 7/04
(Continued)

OTHER PUBLICATIONS

International Search Report corresponding to PCT Application No. PCT/EP2016/058485, dated Jun. 21, 2016 (German and English language document) (7 pages).

*Primary Examiner* — Patrick Hamo
*Assistant Examiner* — Chirag Jariwala
(74) *Attorney, Agent, or Firm* — Maginot, Moore & Beck LLP

(57) ABSTRACT

A pump device, in particular for a brake system of a motor vehicle, includes two hydraulic chambers, a linear drive, and a pump piston. Each of the chambers has at least two fluid connections. The pump piston interacts with the chambers.
(Continued)

The linear drive is embodied as a reluctance drive and includes a longitudinally movable armature, a housing-fastened stator that is configured to receive current, and at least one spring element. The at least one spring element is associated with the armature, and is configured to counteract a drive force of the reluctance drive. The armature is connected to the pump piston.

13 Claims, 6 Drawing Sheets

(51) Int. Cl.
| | |
|---|---|
| *F04B 13/02* | (2006.01) |
| *F04B 25/02* | (2006.01) |
| *H02K 33/02* | (2006.01) |
| *B60T 13/16* | (2006.01) |
| *F04B 49/06* | (2006.01) |
| *F04B 53/14* | (2006.01) |

(52) U.S. Cl.
CPC .............. *F04B 25/02* (2013.01); *F04B 49/06* (2013.01); *F04B 53/14* (2013.01); *H02K 33/02* (2013.01)

(58) Field of Classification Search
CPC .... F04B 5/02; F04B 11/0083; F04B 11/0075; F04B 11/005; F04B 13/00; F04B 13/02; F04B 17/04; F04B 25/02; B60T 13/16; H02K 1/34; H02K 23/68; H02K 33/00; H02K 33/02; H02K 2201/03
See application file for complete search history.

(56) References Cited

U.S. PATENT DOCUMENTS

| | | | |
|---|---|---|---|
| 3,791,770 A | | 2/1974 | Farkos |
| 3,895,281 A | * | 7/1975 | Corbaz ................... H01F 7/064 |
| | | | 318/687 |
| 3,931,554 A | * | 1/1976 | Spentzas ................ H02K 33/12 |
| | | | 318/122 |
| 6,468,057 B1 | * | 10/2002 | Beck ...................... F04B 17/042 |
| | | | 417/411 |
| 2007/0116588 A1 | | 5/2007 | Frefel |
| 2011/0020143 A1 | | 1/2011 | Van Brunt et al. |
| 2013/0249274 A1 | * | 9/2013 | Miyazaki ................ B60T 7/042 |
| | | | 303/6.01 |
| 2014/0161650 A1 | * | 6/2014 | Paweletz ................. F04B 17/03 |
| | | | 417/415 |
| 2016/0221562 A1 | * | 8/2016 | Leiber ................... B60T 13/686 |
| 2017/0141665 A1 | * | 5/2017 | Genderjahn ............. H02K 1/34 |

FOREIGN PATENT DOCUMENTS

| | | |
|---|---|---|
| DE | 195 46 682 A1 | 6/1997 |
| DE | 10 2006 060 147 A1 | 6/2008 |
| DE | 10 2008 040 452 A1 | 1/2010 |
| DE | 20 2011 108 107 U1 | 4/2013 |
| DE | 20 2007 019 534 U1 | 8/2013 |
| EP | 1 553 292 A1 | 7/2005 |
| JP | 2014-117152 A | 6/2014 |

\* cited by examiner

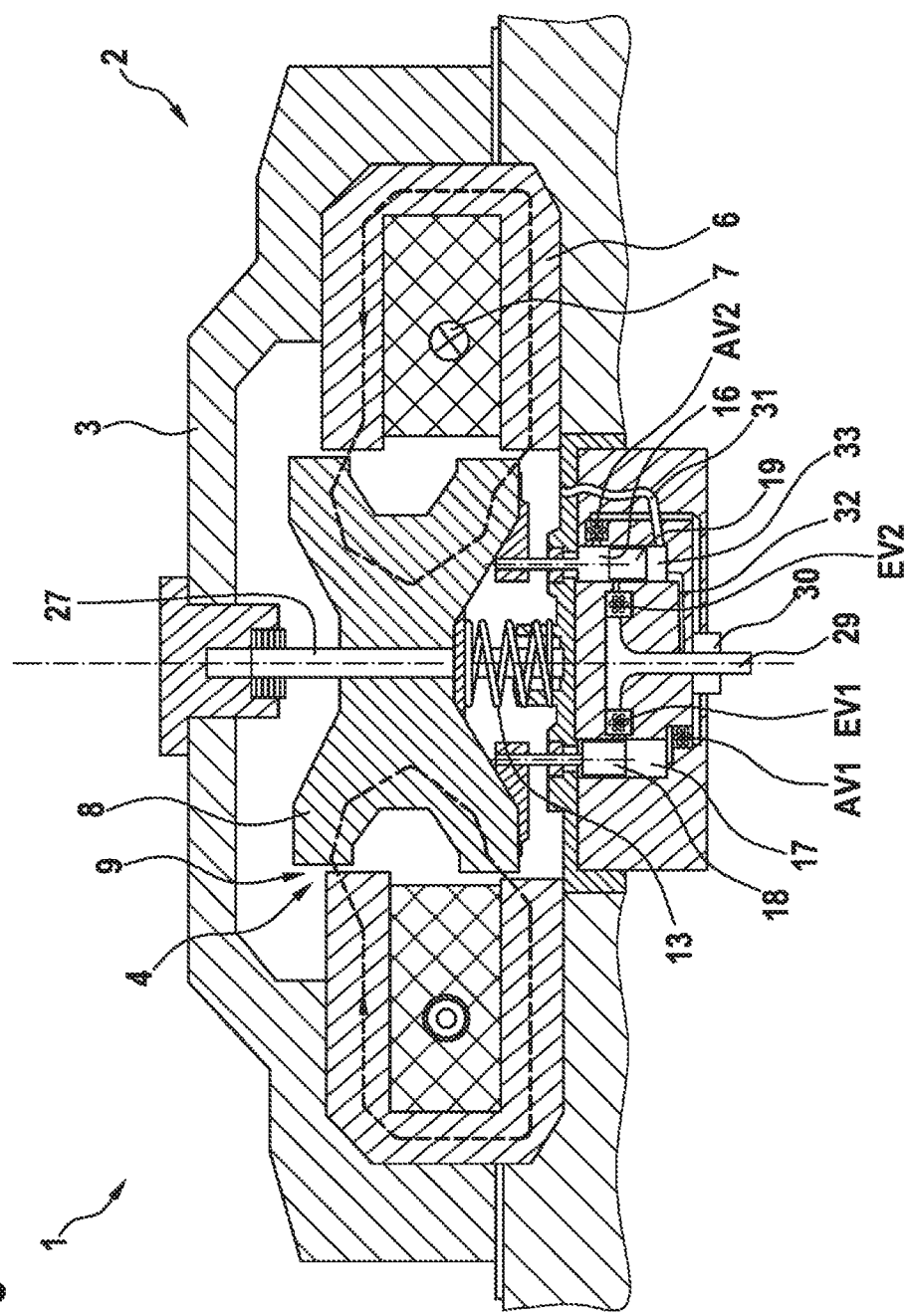

PUMP DEVICE FOR A BRAKE SYSTEM WITH A RELUCTANCE DRIVE

This application is a 35 U.S.C. § 371 National Stage Application of PCT/EP2016/058485, filed on Apr. 18, 2016, which claims the benefit of priority to Serial No. DE 10 2015 209 728.5, filed on May 27, 2015 in Germany, the disclosures of which are incorporated herein by reference in their entirety.

The disclosure relates to a pump device, in particular for a brake system of a motor vehicle, having a linear drive which is constructed as a reluctance drive and which to this end has a longitudinally movable armature and a stator which is secured to a housing and to which current can be applied, or a stator having a coil to which current can be applied, wherein there is associated with the armature at least one resilient element which counteracts a drive force of the reluctance drive, and wherein the armature is connected to at least one pump piston.

The disclosure further relates to a brake system having such a pump device.

BACKGROUND

In principle, it is already known to provide in hydraulic brake systems of motor vehicles a pump device which when required increases a hydraulic pressure in the brake system in order to carry out an automatic braking operation, for example, an emergency braking operation, independently of a brake pedal actuation by the driver. Generally, known pump devices have a piston pump which is driven by an electric motor so that a rotation movement is converted into a translation movement. The omission of conversion of the rotation of the motor into an oscillating piston movement, which conversion involves friction, leads to a higher degree of efficiency and a compact construction of the pump device being ensured.

The piston movement can be controlled by changing the amplitude and frequency thereof independently of each other. These two degrees of freedom in terms of the control enable favorable operating ranges. An advantageous development has been found to be the construction of the linear drive as a reluctance drive which can be produced in a simple, precisely controllable and cost-effective manner. The linear reluctance drive has a longitudinally movable armature and a stator which is secured to a housing and to which current can be applied. If current is applied to the stator, there is produced a magnetic field which leads to the armature being urged into a neutral position in which the magnetic resistance for the magnetic flux of the magnetic circuit is minimal. There is associated in this instance with the armature at least one resilient element which acts on the armature counter to this drive force of the reluctance drive in order to move the armature out of the neutral position. If no current is applied to the stator, therefore, the resilient element urges the armature out of the neutral position into a starting position. If current is applied to the stator again, it urges the armature magnetically counter to the force of the resilient element into the neutral position. As a result of corresponding control of or application of current to the stator, the travel and the frequency of the movement of the armature can consequently be adjusted independently of each other. The armature is in this instance connected to a pump piston which is supported in an axially displaceable manner, for example, in a hydraulic chamber in order to pump the medium located at that location.

SUMMARY

The pump device according to the disclosure has the advantage that the pump device ensures a higher delivery volume than previously and affords the possibility of also applying a hydraulic pressure to two hydraulic circuits which are substantially independent of each other. To this end, there is provision according to the disclosure for the pump device to have hydraulic chambers which each have at least two fluid connections and with which the pump piston cooperates. The disclosure also makes provision for the pump piston to cooperate not only with just one hydraulic chamber, but instead with two hydraulic chambers which each have two fluid connections, in particular an inlet and an outlet, respectively. Each of the hydraulic chambers may in this instance be associated with a separate hydraulic circuit since, by actuating the linear drive, both hydraulic chambers can be acted on with a hydraulic pressure by the pump piston in order to carry out a pumping operation. The power of the pump device is thereby increased in a simple and cost-effective manner.

According to a preferred development of the disclosure, there is provision for the pump piston to be constructed as a dual piston which has two pistons which are each associated with one of the hydraulic chambers, respectively. The pump piston thus has two individual pistons or piston portions which in each case act or are displaceably arranged in one of the hydraulic chambers. The hydraulic chambers are in particular formed by a housing of the pump device, wherein the fluid connections of the hydraulic chambers are also constructed or arranged in the housing. As a result of the fact that the pump piston has two pistons, it is possible in a simple manner to act on two hydraulic chambers with the drive force of the linear drive. Optionally, the pump device may also have at least a third hydraulic chamber with a corresponding third piston of the pump piston.

According to an embodiment of the disclosure, there is preferably provision for the pistons of the pump piston and the hydraulic chambers to be arranged in parallel beside each other. To this end, the pistons are arranged parallel with and spaced apart from each other by the linear drive so as to be able to be displaced in the respective hydraulic chamber. A clear and reliable separation of the hydraulic circuits or the hydraulic chambers from each other can thereby be ensured.

Preferably, the pistons are mechanically securely connected to the armature so that the pistons are also directly moved with the armature. In a particularly preferred manner, there is provision for the armature to form the pump piston itself so that the pistons are constructed integrally with the armature. A reliable and durable construction of the pump device is thereby produced, in particular of the pump piston. The pump piston or armature advantageously has in this instance a substantially Y-shaped longitudinal section.

According to another embodiment of the disclosure, there is preferably provision for the pistons to be hydraulically connected to the armature. The dual piston is consequently formed by two pistons which are mechanically separated from each other and which are hydraulically connected to the armature, wherein the armature itself forms a drive piston or pump pre- piston for hydraulically driving the pistons. In this instance, there is in particular provision for the armature to protrude into a hydraulic chamber or to be able to be pushed through the linear drive in order to apply hydraulic pressure to the hydraulic medium at that location.

This hydraulic pre-chamber is hydraulically connected to the hydraulic chambers in which the pistons are displaceably arranged so that the hydraulic pressure which is produced in the hydraulic pre-chamber is transmitted to the pistons in order to produce in the respective hydraulic chamber a hydraulic pressure for the respective brake circuit/hydraulic circuit. Advantageously, the pistons can in each case be displaced counter to the force of a resilient element which urges the pistons back into their starting position. As a result of being urged back, the hydraulic medium between the pistons and the pre-pistons is acted on with a pressure which urges the pre-piston and the armature back into this neutral position. Additionally, there may be provision for there to be directly associated with the armature an additional resilient element which acts between the armature and, for example, the housing of the pump device, in order to displace the armature into the neutral position thereof.

According to a preferred development of the disclosure, there is provision for the pistons and the hydraulic chambers to be arranged one behind the other in the movement direction of the pistons. A particularly compact construction type of the pump device is thereby achieved, in particular with respect to the structural space requirement of the pump device radially with respect to the movement axis of the pump piston or the armature. The hydraulic chambers and the pistons may in this instance be constructed directly one behind the other or axially with spacing from each other. In order to hydraulically separate the hydraulic chambers which are located one behind the other, there is in particular provision for the pistons to have on the outer covering wall thereof in each case at least one sealing element which extends for the entire periphery of the respective piston and which cooperates in a sealing manner with the inner side of the hydraulic chamber formed by the housing of the pump device in each case.

There is further preferably provision for the dual piston to be constructed as a stepped piston. The pistons which are located one behind the other thereby have different diameters. In particular, there is provision for a first of the pistons to have at the free end of the pump piston a smaller diameter than the second piston of the pump piston, which piston is arranged with spacing from the free end. In accordance with the sizing of the pistons, the hydraulic chambers also have different diameters, wherein the hydraulic chambers are constructed in the housing of the pump device as stepped chambers, in particular as stepped holes.

As already mentioned, there is preferably provision for the hydraulic chambers and/or the fluid connections to be constructed in a pump housing of the pump device. In particular, the hydraulic chambers and/or the fluid connections are constructed as holes in the pump housing so that the pump device withstands high loads, in particular high hydraulic pressures.

According to a preferred development of the disclosure, there is further provision for the hydraulic chambers and/or the fluid connections to be constructed in an insertion component of the pump device, which insertion component is arranged in the pump housing. The pump housing is in this regard in particular constructed in several portions, wherein the portion which has the hydraulic chambers and/or the fluid connections is constructed as an insertion component. The production costs for the pump device can thereby be reduced since the insertion component and the pump housing can be produced separately from each other, whereby, for example, cost-effective processing/production methods can be used.

There is further preferably provision for a valve device, in particular a non-return valve, to be associated with at least one of the fluid connections. The valve device is preferably arranged or constructed so as to be integrated in the pump housing of the pump device. Advantageously, there is associated with each fluid connection a valve device which is either constructed as an actuatable valve device for releasing or closing a flow cross section of the respective fluid connection or which is constructed as a non-return valve in order to automatically release or close a closure of the respective fluid connection depending on pressure relationships via the non-return valve.

The brake system according to the disclosure is distinguished in that the pump device is constructed according to the disclosure. The advantages already mentioned are thereby afforded. Other features and advantages will be appreciated from what has been described above and from the claims.

BRIEF DESCRIPTION OF THE DRAWINGS

The disclosure is intended to be explained in greater detail below with reference to the drawings, in which:

FIG. 5 shows a fifth embodiment of the pump device.

DETAILED DESCRIPTION

Figure 1:
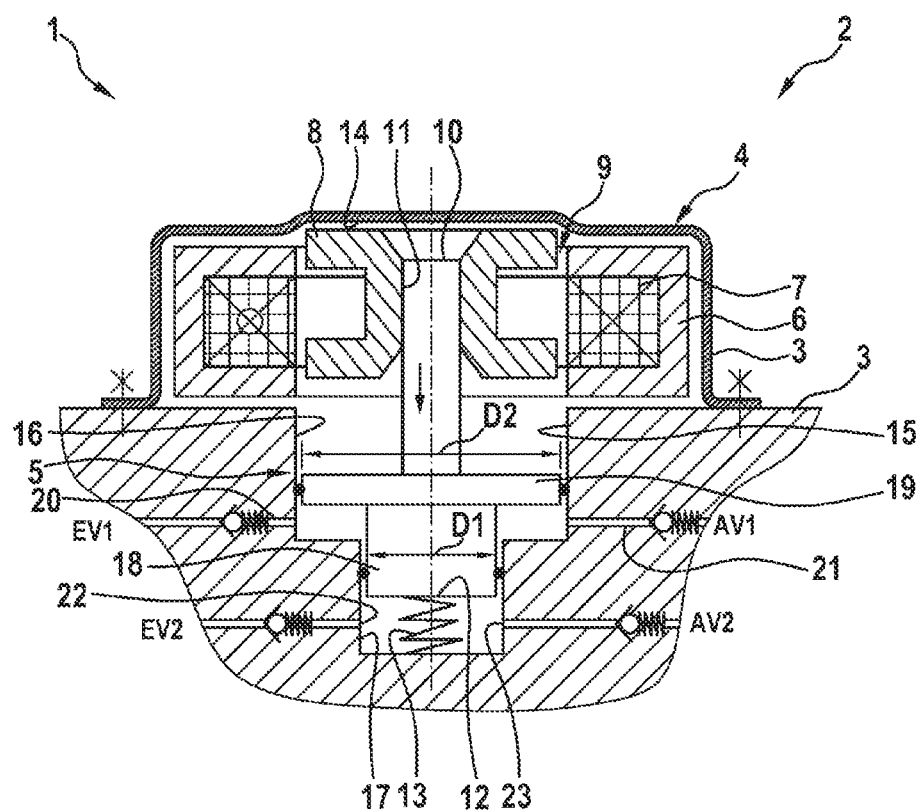
FIG. 1 shows a first embodiment of a pump device.

FIG. 1 is a simplified sectioned illustration of a first embodiment of a pump device 1 for a brake system 2 of a motor vehicle which is not illustrated in greater detail here.

The pump device 1 has a pump housing 3 in which a linear drive 4 and a pump piston 5 which can be driven by the linear drive 4 are arranged.

The linear drive 4 is constructed as a linear reluctance drive or reluctance drive and has to this end a stator 6 which is secured to a housing and which has a winding 7 to which current can be applied and a ferromagnetic armature 8. The armature 8 is constructed in an axially displaceable and in particular rotationally symmetrical manner. The stator 6 surrounds the armature 8 radially, wherein an operating air gap 9 remains between the armature 8 and the stator 6.

The armature 8 is securely connected to the pump piston 5. To this end, a first end 10 of the pump piston 5 which is associated with the linear drive 4 is retained in a state compressed centrally in a receiving opening 11 of the armature 8. In this instance, it is also conceivable for the armature 8 and pump piston 5 to be constructed in an integral manner or to be securely connected to each other by means of welding, screwing and/or adhesive bonding.

At the second end 12 of the pump piston 5 facing away from the first end 10, there is arranged a resilient element 13 which is constructed in this instance as a helical spring and which is retained in a pretensioned manner between the pump housing 3 and the free end 12 of the pump piston 5 so that it urges the pump piston 5 in the direction of the stator 6. In this instance, the resilient element 13 urges the pump piston 5 in particular as far as a stop 14 of the pump housing 3. If the armature 8 is in abutment with the stop 14, the armature 8 and stator 6 overlap each other only partially. The stator 6 is constructed so as to complement the armature 8.

This means that at least one linear armature position of the armature 8 with respect to the stator 6 there can be assumed a position in which the magnetic resistance for the magnetic flux produced by an application of current to the winding 7 is minimal. In particular, as illustrated above, the cylindrical faces of the stator 6 and armature 8 in the region of the operating air gap 9 are constructed to be axially of the same length. There is thereby produced during operation a position of the armature 8 in which the resulting axial force when current is applied to the stator 6 is equal to zero, that is to say, when the armature 8 and stator 6 are arranged at the same height. This position is also referred to below as the neutral position. The resilient element 13 urges the armature 8 out of the neutral position against the stop 14, as shown in FIG. 1. If current is thus applied to the coil 7, there is produced a drive force by means of which the armature 8 together with the pump piston 5 is moved counter to the force of the resilient element 13 until the armature 8 reaches the neutral position.

The pump housing 3 further has a stepped hole 15, wherein a first step of the hole has a diameter which at least corresponds to the outer diameter of the armature 8 and which adjoins the linear drive 4, and wherein a second step of the stepped hole 15 has a diameter which is reduced in comparison with the first step. The steps of the stepped holes form in this instance a first hydraulic chamber 16 and a second hydraulic chamber 17.

The pump piston 5 is constructed as a stepped piston and consequently constitutes a dual piston. In this instance, the pump piston 5 has at the free end 12 thereof a first piston 18 having a first diameter D1. In a state with spacing from the free end 12, the pump piston 5 further has a second piston 19 whose outer diameter D2 is greater than the outer diameter D1. In this instance, there is provision for the diameter D1 to substantially correspond to the inner diameter of the hydraulic chamber 17 and the diameter D2 to substantially correspond to the inner diameter of the hydraulic chamber 16, wherein the first piston 18 of the hydraulic chamber 17 and the second piston 19 is displaceably arranged in the hydraulic chamber 16, and wherein the respective piston 18, 19 delimits the respective hydraulic chamber 16, 17 so that, as a result of a movement of the pump piston, the volume of the respective hydraulic chamber 16, 17 can be changed.

Two fluid connections 20, 21 or 22, 23 are further associated with each hydraulic chamber 16, 17. A non-return valve EV1, AV1, EV2 or AV2 is further associated with each fluid connection 20 to 23. The non-return valves EV1 and EV2 open in this instance in the direction of the respective hydraulic chamber 16 or 17, whilst the non-return valves AV1 and AV2 close in the direction of the respective hydraulic chamber 16, 17. Consequently, the non-return valves EV1 and EV2 form inlet valves and the non-return valves AV1 and AV2 form outlet valves for the respective hydraulic chamber 16 or 17. Consequently, there is associated with each fluid connection 20 to 23 a valve device which is constructed independently in order depending on a pressure difference over the respective non-return valve to release or close the respective fluid connection 20 to 23. A pumping operation is thereby automatically carried out by controlling the linear drive 4.

If current is applied to the coil 7 from the state illustrated in FIG. 1, the armature 8 is displaced together with the pump piston 5 in the direction of the resilient element 13, as indicated by an arrow. In this instance, the piston 19 increases the pressure in the hydraulic chamber 16 and the piston 18 increases the pressure in the hydraulic chamber 17 until the respective outlet valve AV1, AV2 automatically opens and hydraulic medium from the respective hydraulic chamber 16, 17 can be discharged via the respective fluid connection 21, 23. The hydraulic chambers 16, 17 are in this instance associated with different hydraulic circuits, in particular brake circuits, of the brake system 2.

The coil 7 is supplied with electrical power from a voltage source and controlled by means of an electronic power system. Using the size of the voltage amplitude of the voltage supply and the duration of current supply determined by the electronic power system, both the redirection amplitude, that is to say, the travel of the armature 8, and the movement frequency thereof are determined. Preferably, the frequency is selected to be close to the mechanical inherent frequency of the armature 8. During operation of the pump device 1, the neutral position of the armature is preferably not reached. Generally, the stator current is switched off before this position is reached. The travel of the armature 8 is thereby controlled in accordance with the potential energy of the resilient element 13. As a result of the adjustment of the current, the volume flow of the pump device 1 is controlled and regulated at a specific pressure from the high-pressure side of the pump.

Figure 2:
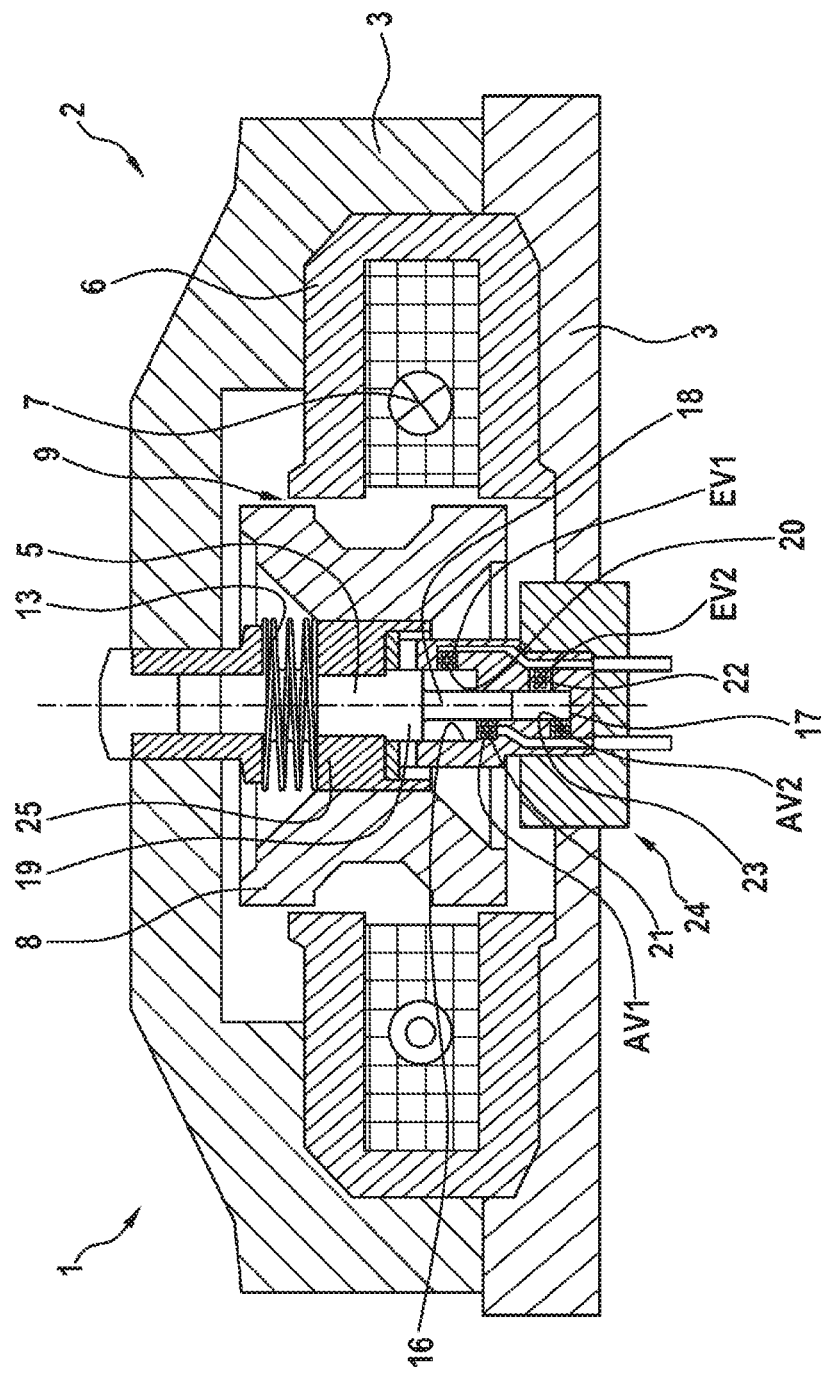
FIG. 2 shows a second embodiment of the pump device.

FIG. 2 shows a second embodiment of the pump device 1, wherein elements already known from FIG. 1 are provided with the same reference numerals and in this regard reference may be made to the above description. This also applies to the embodiments described in FIGS. 3 to 6. Substantially only the differences between the embodiments are intended to be discussed below.

The second embodiment differs from the first embodiment substantially in that the pump housing has a separate insertion component 24 which is inserted into the housing and which forms the hydraulic chambers 16, 17. The provision of the hydraulic chambers 16, 17 by means of a separate insertion portion 24 results in the production costs for the pump device 1, in particular for the pump housing 3, being able to be reduced. Furthermore, the second embodiment differs from the first embodiment in that the resilient element 13 is not associated with the free end 12 of the pump piston 5 but instead with the free end 10 which in this instance protrudes from the side of the armature 8 facing away from the hydraulic chambers 16, 17. Furthermore, the resilient element is retained between the armature 8 or an armature carrier 25 which is securely connected to the armature 8, and the housing 3, wherein in this instance the resilient element is constructed as a pretensioned tension spring. The operation of the pump device 1 according to the second embodiment is carried out as described above.

Figure 3:
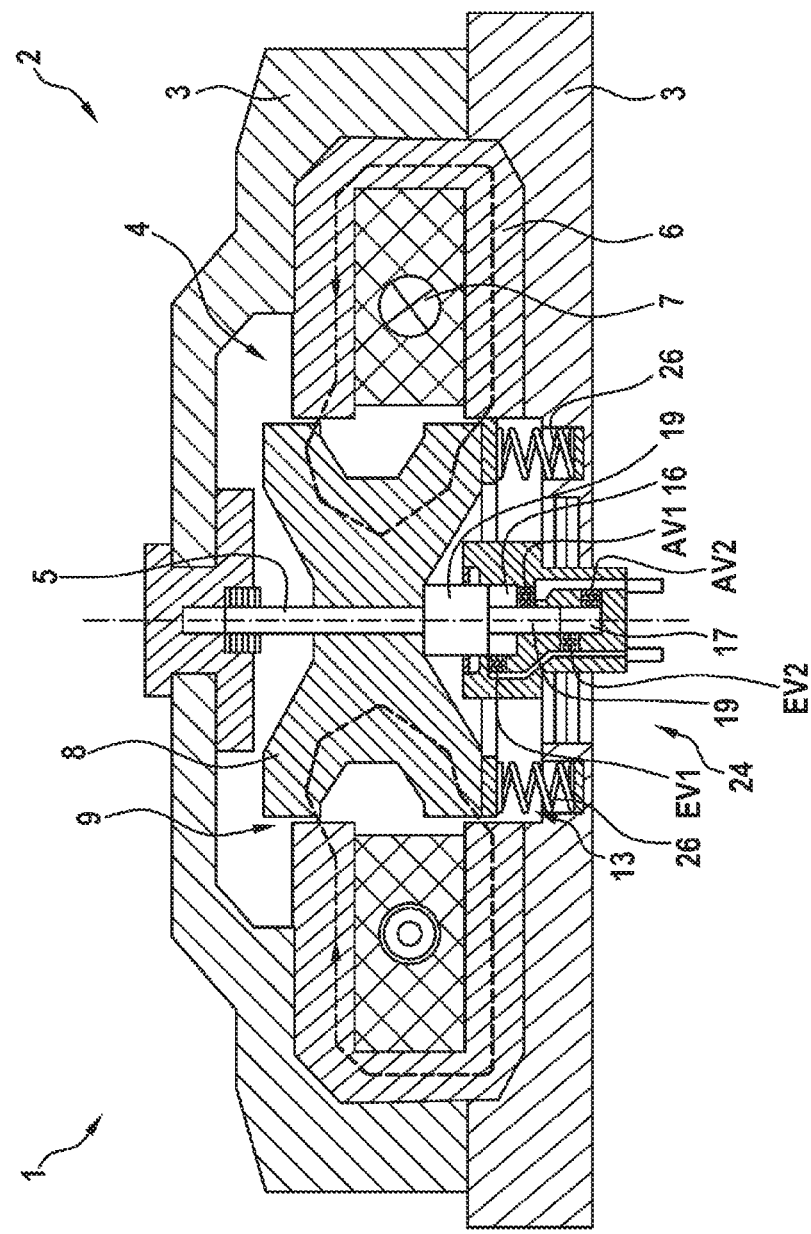
FIG. 3 shows a third embodiment of the pump device.

The pump device 1 according to a third embodiment which is shown in FIG. 3 differs from the previous embodiment in that the resilient element cooperates with the side of the armature 8 facing the hydraulic chambers 16, 17. To this end, the resilient element 13 is retained in a pretensioned manner between the armature 8 and the housing 3 at the side of the hydraulic chambers 16, 17 or the insertion component 25 and constructed as a pressure spring. The resilient element 13 may in this instance be constructed by means of a helical spring which is arranged concentrically with respect to the movement axis of the pump piston 5. Alternatively, as shown in FIG. 3, there may also be provided a plurality of individual helical springs 26, which are arranged in a state distributed in a uniform manner over the periphery of the armature 8 and which are retained between the armature 8 and the housing 3 as described above in a pretensioned manner in order to move the armature 8 from the neutral position into the starting position. Using dashed arrows in FIG. 3, the magnetic flux when current is applied to the stator 9 is further indicated. This variant of the pump device 1 enables a more compact structure of the pump device and allows more free spaces for the sizing of the magnetic circuit.

Figure 4A:
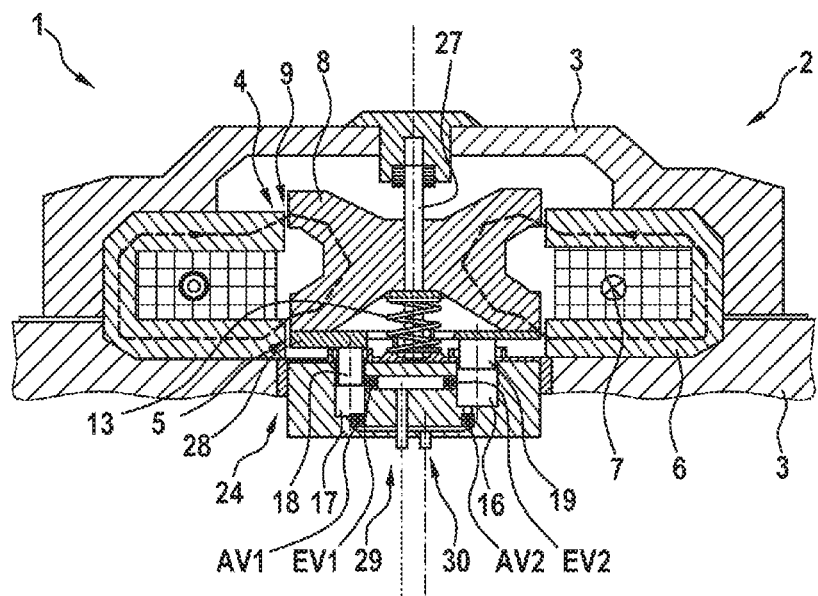
FIGS. 4A and 4B show a fourth embodiment of the pump device.
Figure 4B:
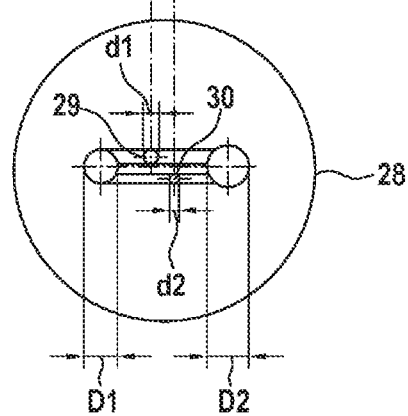

FIGS. 4A and 4B show a fourth embodiment of the pump device 1 as a longitudinal section (FIG. 4A) and as a bottom view (FIG. 4B). In contrast to the above embodiment, the pistons 18 and 19 are now arranged beside each other and parallel with each other. The armature 8 is supported so as to be able to be displaced along a fixed guiding pin 27 in the housing 3, as described above. In this instance, the resilient element 13 in the form of a pressure spring is retained in a pretensioned manner between the armature 8 and the housing 3. The pump piston 5 which is produced from non-magnetic material is in this instance formed by means of a circular-ring-shaped disc which is in abutment with the lower side of the armature 8 and which carries the two pistons 18 and 19 at the side opposite the armature 8. The pistons 18, are in this instance arranged diametrically opposite each other with respect to the movement axis of the armature 8 at the lower side of the disc 28. Accordingly, the hydraulic chambers 16 and 17 are also constructed beside each other in the housing 3 or in this instance in the insertion component 24. As a result of the different diameters D1 and D2 of the pistons 18, 19 and where applicable a different starting position (piston height), an advantageous phase displacement of the pressure pulses produced by the pistons 18, 19 for the respective hydraulic circuit is achieved. The pressure progression at the pressure side of the pump device is thereby advantageously compensated for and the content of harmonic waves in the pressure progression becomes smaller. Consequently, the oscillation behavior and the acoustic excitation which are emitted from the pump device 1 improve. As a result of selective sizing of the diameters D1, D2, of the piston strokes and the flow cross sections of the fluid connections, the pump device can be adapted in a simple manner to different applications. As a result of the pistons 18 and 19 and the hydraulic chambers 17 and 16 being arranged beside each other, it is possible for a spatial separation of the hydraulic circuits to be ensured in a reliable manner. Separate seals and bearings can be associated with the hydraulic circuits, whereby the sealing of the pump device is ensured in the long term. In this instance, the pump piston 5 is also constructed as a dual piston.

FIG. 4B is a plan view of the lower side of the insertion component 24, wherein the different diameters D1, D2 of the pistons 18, 19 and the diameters d1 of a common fluid inlet 29 and d2 of a common fluid outlet 30 are shown. In this instance, therefore, the hydraulic medium is supplied from the hydraulic chambers 17, 16 to a common fluid outlet 30 or removed from a common fluid inlet 29. Alternatively, there may be provision, as already mentioned above, for a separate hydraulic circuit to be associated with each hydraulic chamber 16, 17 so that no common fluid connections are produced.

FIG. 5 shows a fifth embodiment of the pump device 1 which differs from the previous embodiment in that the common fluid connections 29, 30 are arranged coaxially with respect to each other, whereby a particularly compact embodiment of the pump device is produced.

According to this embodiment, there is provision for one of the hydraulic chambers, in this instance the hydraulic chamber 16, to be arranged between the armature 8 and the piston 19 so that a pumping operation in the hydraulic chamber 16 is carried out when the piston 19 is moved back as a result of the force of the resilient element 13 into the starting position thereof. As a result of this transposed orientation or function of the two pistons 18, 19, an advantageous phase displacement of the pressure pulses by a half-period T/2 in both hydraulic circuits/subsystems is achieved. The pressure progression at the high-pressure side is thereby compensated for and the content of the harmonic waves in the pressure progression is further reduced. Consequently, the oscillation behavior and the acoustic excitation which are emitted from the pump device 1 are improved. However, the second subsystem in the piston 19 requires a pressure compensation circuit as a result of the transposed hydraulic chamber 16. To this end, there is provision in this instance for a pressure compensation chamber 33 to be constructed at the side of the piston 19 facing away from the armature.

There is further provision in this instance for a pressure compensation line 31 to be optionally constructed between the pressure compensation chamber 33 and the operating space of the armature 8 and/or a pressure compensation line 32 to be optionally constructed between the pressure compensation chamber 33 and the common fluid inlet 29.

The pump housing 3 is produced from non-magnetic material and surrounds all the active elements of the pump device and ensures structurally the most precise centricity possible with the smallest possible operating air gap 9. In this instance, all the elements of the magnetic circuit, that is to say, armature 8, stator 6 and coil 7, are arranged in a rotationally symmetrical manner around the piston axis or movement axis of the armature 8.

Figure 6:
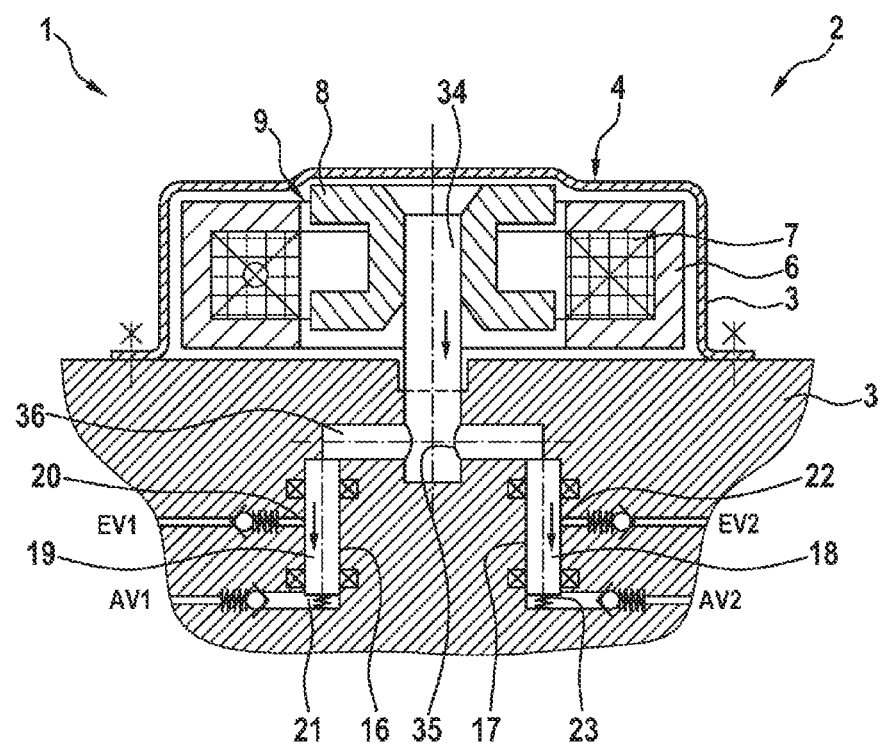
FIG. 6 is a simplified sectioned illustration of a sixth embodiment of the pump device, respectively.

FIG. 6 shows a sixth embodiment of the pump device 1, wherein the pistons 18, 19 are also arranged beside each other in this instance. In contrast to the above embodiments, however, the pistons 18, 19 do not form any mechanical unit with each other. Instead, the pistons 18, 19 are operationally connected in a hydraulic manner to the armature 8 or to a pump pre-piston which is securely connected to the armature 8. The pump pre-piston 34 has at the free end thereof facing away from the armature 8 a diameter tapering 35. With this diameter tapering 35, the pump pre-piston 34 is positioned in a hydraulic pre-chamber 36 in which a hydraulic medium is present. If the pump pre-piston 34 is acted on by the armature 8 with the drive force of the linear drive 4, it is driven into the hydraulic pre-chamber 36 in such a manner that, as a result of the increasing diameter thereof resulting from the movement, a pressure is produced in the hydraulic pre-chamber 36 and acts on the pistons 18, 19 in order to displace them. The pistons 18, 19 are thus hydraulically actuated. In this instance, the pistons 18, 19 are as described above displaceably arranged in one of the hydraulic chambers 17, 16, respectively, wherein the fluid connections 20 to 23 in particular of different hydraulic circuits are associated with the hydraulic chambers 16, 17 as already described above. Preferably, there is associated in each case with the pistons 18, 19 a resilient element which counteracts the hydraulic actuation force so that the pistons 18, 19 are moved back into their starting position by means of resilient force. The hydraulic pressure which is produced thereby further acts on the pump pre-piston 34, whereby it is where applicable urged back into the starting position thereof. However, there is preferably also associated with the pump pre-piston 34 a resilient element (not shown here) which counteracts the drive force of the linear drive 4 so that the pump piston is always displaced reliably into the starting position thereof from the neutral position when current is no longer applied to the coil 7.

The invention claimed is:

1. A pump device, comprising:
a housing;
a pump piston;
two hydraulic chambers that each include at least two fluid connections, and that are configured to cooperate with the pump piston;
a linear drive embodied as a reluctance drive, and including:
a longitudinally movable armature connected to the pump piston;
a stator secured to the housing and configured to receive an applied current; and
at least one resilient element associated with the armature, and configured to counteract a drive force of the reluctance drive,
wherein the stator defines a first cylindrical face having a first axial length in a region of an air gap between the stator and the armature,
wherein the armature defines a second cylindrical face having a second axial length in the region of the air gap,
wherein the first axial length is equal to the second axial length,
wherein the armature defines a neutral position relative to the stator in which (i) electrical current is applied to the stator and a resultant axial force is zero, and (ii) the armature and the stator are arranged at the same height with the first cylindrical face fully axially aligned with the second cylindrical face, and
wherein the at least one resilient element is configured to urge the armature out of the neutral position.

2. The pump device as claimed in claim 1, wherein at least one of the two hydraulic chambers and the at least two fluid connections of at least one of the two hydraulic chambers are located in the pump housing of the pump device.

3. The pump device as claimed in claim 1, further comprising:
an insertion component positioned in the pump housing;
wherein at least one of the two hydraulic chambers and the at least two fluid connections of at least one of the two hydraulic chambers are located in the insertion component of the pump device.

4. The pump device as claimed in claim 1, further comprising:
a valve device associated with at least one of the at least two fluid connections of at least one of the two hydraulic chambers.

5. The pump device as claimed in claim 4, wherein the valve device is a non-return valve.

6. The pump device as claimed in claim 1, wherein the pump piston is a dual piston which has two pistons that are each associated with a respective one of the two hydraulic chambers.

7. The pump device as claimed in claim 6, wherein the dual piston is a stepped piston.

8. The pump device as claimed in claim 6, wherein the two pistons and the two hydraulic chambers are arranged in parallel beside each other.

9. The pump device as claimed in claim 6, wherein the two pistons are mechanically connected to the armature.

10. The pump device as claimed in claim 6, wherein the two pistons are hydraulically connected to the armature.

11. The pump device as claimed in claim 6, wherein the two pistons and the two hydraulic chambers are arranged in series along a movement direction of the two pistons.

12. A brake system, comprising:
a pump device that includes:
a housing;
a pump piston;
two hydraulic chambers that each include at least two fluid connections, and that are configured to cooperate with the pump piston; and
a linear drive embodied as a reluctance drive, and having:
a longitudinally movable armature connected to the pump piston;
a stator secured to the housing and configured to receive an applied current; and
at least one resilient element associated with the armature, and configured to counteract a drive force of the reluctance drive; and
at least one hydraulic circuit hydraulically connected to the pump device and that, in each case, has at least one hydraulically actuatable wheel brake,
wherein the stator defines a first cylindrical face having a first axial length in a region of an air gap between the stator and the armature,
wherein the armature defines a second cylindrical face having a second axial length in the region of the air gap,
wherein the first axial length is equal to the second axial length,
wherein the armature defines a neutral position relative to the stator in which (i) electrical current is applied to the stator and a resultant axial force is zero, and (ii) the armature and the stator are arranged at the same height with the first cylindrical face fully axially aligned with the second cylindrical face, and
wherein the at least one resilient element is configured to urge the armature out of the neutral position.

13. The pump device as claimed in claim 1, wherein the pump device is a pump device for a brake system of a motor vehicle.

* * * * *